This invention relates to new organotin compounds and to a process of preparing the same.

More particularly the invention pertains to organotin arsonates derived from tetravalent tin in which two or three of the valences are filled with an organic radical while the remaining bond or bonds make linkage with an arsonic group.

The compounds of this invention represent a new type of substances which have manifold uses. They are valuable remedies in the prophylactic control and suppression of various protozoal infections such as coccidiosis, hexamitiasis and histomoniasis in poultry. They are also potent anthelmintics in the treatment of avian tapeworm infections, and they have shown considerable usefulness as insecticides and chloride scavengers.

In their broadest aspect our new compounds may be represented by the general empiric formula $$R_{(n)} \cdot Sn \cdot [O \cdot H_{(m)} \cdot Z]_{3-n+m}$$

wherein R may be a substituted or unsubstituted alkyl, aryl, aralkyl or heterocyclic radical, Z represents the arsonic acid group

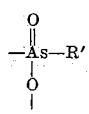

$n$ is either 2 or 3, $m$ is either 0 or 1, $n-m$ is not greater than 2, and wherein the oxygen in the bracketed portion is attached to the arsenic atom in Z and is linked to the tin atom when $m$ is 0, and to the hydrogen atom when $m$ is 1.

The compounds covered by the foregoing formula include three classes of arsonates defined by the following structural configurations, in which the letter R designates the organic moiety attached to the tin atom, and the letter R' denotes similar substituents in the arsonic group.

I. Tri-organo tin monoarsonates

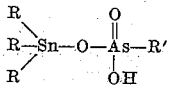

when $n=3$, and $m=1$;

II. Di-organo tin diarsonates

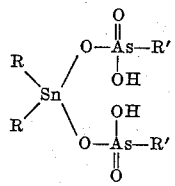

when $n=2$, and $m=1$;

III. Di-organo tin monoarsonates

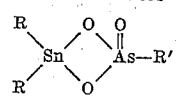

when $n=2$, and $m=0$.

As already indicated, the substituents R and R' may include a wide variety of radicals. They may, for instance, be represented by any substituted or unsubstituted alkyl group derived from the class of paraffines or saturated hydrocarbons. Examples of such residues are methyl, ethyl, propyl, butyl, lauryl, amyl, hexyl, benzyl, and so forth. The group may consist of straight chain radicals wtih progressive carbon linkages, and it may also include isomeric derivatives of chain and side chain structures, such as 2-methyl butyl and isopropyl. The alkyl group may further be substituted by various other radicals such as hydroxy, halogen, nitro or amino; or it may contain an oxygen bridge as in methoxyethyl, ethoxyethyl, butoxyethyl, butoxypropyl, butoxybutyl, and similar structures.

R and R' may also stand for unsaturated derivatives of the paraffinic series which are commonly known as alkenes and alkynes. Both straight chain and branched chain substituents can be used within this series. Examples are allyl, 1-butenyl, 2-butenyl, 1-pentenyl, crotyl, cinnamyl and equivalent groups. As a further variation R and R' may be formed by alicyclic radicals of aliphatic nature such as cyclohexyl and cyclopropyl.

Among the aromatic structures R and R' may be represented by any substituted or unsubstituted members of the benzene class, such as phenyl, tolyl, xylyl and cymyl. Each of the residues may again be substituted both in the nucleus and in the side chain by such groups as nitro, amino, halogen, hydroxyl and the like. In addition to the phenyl ring radicals, the next higher homologues may constitute the organic moiety of R and R' as illustrated by naphthyl, anthracyl and their variedly substituted derivatives. Examples of heterocyclic radicals are furyl, thienyl, thenyl, pyridil, pyrimidyl, pyrazyl, quinoxalyl, etc. The several R and R' portions in the molecule of our new organo tin arsonates may be either of identical structure or they may be formed by different radicals. Thus, for instance, R may stand for butyl and crotyl, while R' is represented by a phenyl or a substituted phenyl group.

Specific illustrations of our new compounds included in the above defined three classes of organo tin arsonates are:

I

Tributyl tin benzene arsonate
Tributyl tin 4-nitrobenzene arsonate
Tributyl tin 3-nitro-4-hydroxybenzene arsonate
Tributyl tin 3-nitro-4-aminobenzene arsonate
Tributyl tin 4-chlorobenzene arsonate
Tributyl tin 2-chlorobenzene arsonate
Tributyl tin 4-aminobenzene arsonate
Tributyl tin 4-hydroxybenzene arsonate
Triphenyl tin benzene arsonate
Triphenyl tin 4-nitrobenzene arsonate
Triphenyl tin 3-nitro-4-hydroxybenzene arsonate
Triphenyl itn 3-nitro-4-aminobenzene arsonate
Triphenyl tin 4-chlorobenzene arsonate
Triphenyl tin 2-chlorobenzene arsonate
Triphenyl tin 4-aminobenzene arsonate
Triphenyl tin 4-hydroxybenzene arsonate
Tribenzyl tin benzene arsonate
Tribenzyl tin 4-nitrobenzene arsonate
Tribenzyl tin 3-nitro-4-hydroxybenzene arsonate
Tribenzyl tin 3-nitro-4-aminobenzene arsonate
Tribenzyl tin 4-chlorobenzene arsonate
Tribenzyl tin 2-cholorobenzene arsonate
Tribenzyl tin 4-aminobenzene arsonate
Tribenzyl tin 4-hydroxybenzene arsonate
Tri-para-tolyl tin naphthyl arsonate
Tricyclohexyl tin butyl arsonate
Dibutyl lauryl tin 4-hydroxybenzene arsonate
Diallyl benzyl tin 3-nitro-4-aminobenzene arsonate
Di-iso propyl pyridyl tin lauryl arsonate
Diethyl n-amyl tin arsanilate
Tri-para-bromophenyl tin ethyl arsonate
Tri-(2-chlorovinyl) tin 4-hydroxybenzene arsonate
Butyl dimethyl tin propyl arsonate

II

Dibutyl tin di-(benzene arsonate)
Dibutyl tin di-(4-nitrobenzene arsonate)
Dibutyl tin di-(3-nitro-4-hydroxybenzene arsonate)
Dibutyl tin di-(3-nitro-4-aminobenzene arsonate)
Dibutyl tin di-(4-chlorobenzene arsonate)
Dibutyl tin di-(2-chlorobenzene arsonate)
Dibutyl tin di-(4-aminobenzene arsonate)
Dibutyl tin di-(4-hydroxybenzene arsonate)
Diphenyl tin di-(benzene arsonate)
Diphenyl tin di-(4-nitrobenzene arsonate)
Diphenyl tin di-(3-nitro-4-hydroxybenzene arsonate)
Diphenyl tin di-(3-nitro-4-aminobenzene arsonate)
Diphenyl tin di-(4-chlorobenzene arsonate)
Diphenyl tin di-(2-chlorobenzene arsonate)
Diphenyl tin di-(4-aminobenzene arsonate)
Diphenyl tin di-(4-hydroxybenzene arsonate)
Dibenzyl tin di-(benzene arsonate)
Dibenzyl tin di-(4-nitrobenzene arsonate)
Dibenzyl tin di-(3-nitro-4-hydroxybenzene arsonate)
Dibenzyl tin di-(3-nitro-4-aminobenzene arsonate)
Dibenzyl tin di-(4-chlorobenzene arsonate)
Dibenzyl tin di-(2-chlorobenzene arsonate)
Dibenzyl tin di-(4-aminobenzene arsonate)
Dibenzyl tin di-(4-hydroxybenzene arsonate)
Diphenyl tin dibutyl arsonate
Di-(para-bromophenyl) tin dibutyl arsonate
Diethoxy ethyl tin di-(propyl arsonate)
Benzyl-butyl-phenyl tin di-(4-nitrobenzene arsonate)
1-Butenyl 1-pentenyl tin di-(methyl arsonate)
1-Dinaphthyl tin di-(3-nitro-4-hydroxybenzene arsonate)
Benzyl paratolyl tin di-(4-hydroxybenzene arsonate)

III

Dibutyl tin benzene arsonate
Dibutyl tin 4-nitrobenzene arsonate
Dibutyl tin 3-nitro-4-hydroxybenzene arsonate
Dibutyl tin 3-nitro-4-aminobenzene arsonate
Dibutyl tin 4-chlorobenzene arsonate
Dibutyl tin 2-chlorobenzene arsonate
Dibutyl tin 4-aminobenzene arsonate
Dibutyl tin 4-hydroxybenzene arsonate
Diphenyl tin benzene arsonate
Diphenyl tin 4-nitrobenzene arsonate
Diphenyl tin 3-nitro-4-hydroxybenzene arsonate
Diphenyl tin 3-nitro-4-aminobenzene arsonate
Diphenyl tin 4-chlorobenzene arsonate
Diphenyl tin 2-chlorobenzene arsonate
Diphenyl tin 4-aminobenzene arsonate
Diphenyl tin 4-hydroxybenzene arsonate
Dibenzyl tin benzene arsonate
Dibenzyl tin 4-nitrobenzene arsonate
Dibenzyl tin 3-nitro-4-hydroxybenzene arsonate
Dibenzyl tin 3-nitro-4-aminobenzene arsonate
Dibenzyl tin 4-chlorobenzene arsonate
Dibenzyl tin 2-chlorobenzene arsonate
Dibenzyl tin 4-aminobenzene arsonate
Dibenzyl tin 4-hydroxybenzene arsonate
Dibutyl tin 3-nitrobenzene arsonate
Diphenyl tin butyl arsonate
Di-(para-iodophenyl) tin heptyl arsonate
Cyclohexyl phenyl tin 4-nitrobenzene arsonate
Benzyl amyl tin butyl arsonate
Diortho anisyl tin 4-aminobenzene arsonate The physical properties of the compounds, particularly their melting points and solubilities in organic solvents vary with their structural configurations. For the most part they are crystalline solids with decomposition points or melting points above 150° C. The members of class II comprising two arsonic acid units are generally soluble in normal butyl alcohol while the monoarsonates of series I and III show no solubility in organic solvents. They are therefore used in various organic or inorganic media in suspended or dispersed form, stabilized by suitable surface active agents.

Structurally, the substances may be considered as organotin salts of arsonic acid which has the formula given on the following page.

$$\mathrm{HO-\overset{\overset{O}{\|}}{\underset{\underset{OH}{|}}{As}}-R}$$

wherein two electropositive hydrogen atoms are available for salt formation with the electronegative portions of an organotin compound. In classes I and II only one of the arsonic hydrogens has entered into reaction, while in series III both of the acidic functions have come into union with the tin moiety by the formation of a double oxygen bridge. Corroboration of these structural concepts is supplied by the assay values for arsenic and tin and also by the nature and amounts of the by-products eliminated during the condensation process.

The new substances are generally prepared by subjecting organotin compounds carrying readily reactive polar groups to the action of an arsonic acid at elevated temperatures, whereby the polar radical of the organotin molecule combines with one or more hydrogen ions of the arsonic acid and is replaced by the electronegative arsonic acid portion. Organotin compounds capable of this reaction are the acetates, butyrates, oxides, hydroxides and many other equivalent structures with comparatively labile electronegative functions. If, for instance, a butyl tin oxide is reacted with an arsonic acid, the oxygen atom of the tin compound will unite with the two hydroxylic hydrogens of the acid with formation of water which can be collected and assayed by the method of Dean and Stark. In the case of an acetate, acetic acid will be evolved in the corresponding manner and its amount can be determined by the weight loss of the reaction mixture. It is thus possible to check the course of the reaction for evidence of how many mols of the reacting partners have undergone condensation.

The process can be carried out with or without solvents; when solvents are used, suitable selections are benzene, toluene, xylene and acetic acid.

The temperature at which the reaction is effected lies at least at steam bath temperature or about at 200° F.; however in certain cases involving sluggish molecules a higher thermal excitation may be required. The condensation is ordinarily completed within about one to two hours.

It will be observed that the reaction between the organotin compounds and the arsonic acid proceeds in strict stoichiometric proportions. Thus, if 1 mol of a bipolar tin compounds is condensed with 2 mols of an arsonic acid, only one hydroxylic hydrogen of each will participate in the reaction to form a diarsonate

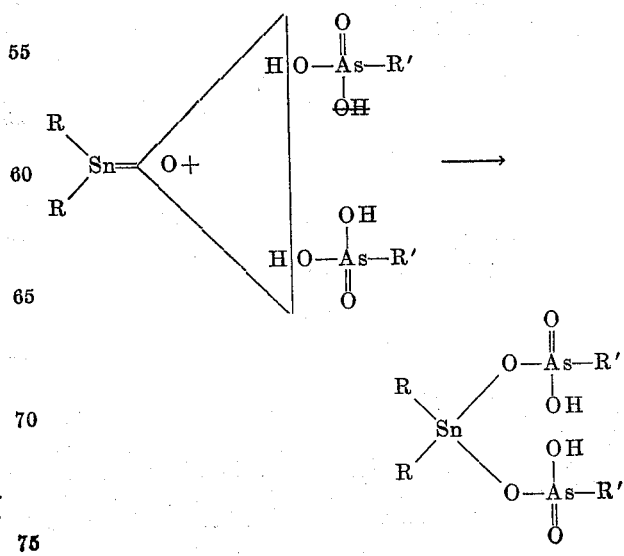

If, on the other hand, only 1 mol of arsonic acid is used, both hydroxylic hydrogen ions will be activated and a monoarsonate will be obtained

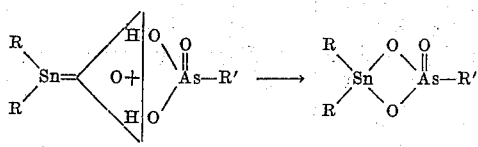

The following examples will serve to further illustrate the invention.

*Example 1.—Di-n-butyl tin di-(4-nitrobenzene arsonate)*

70.2 grams (0.2 mol) of the liquid compound di-n-butyl tin diacetate were thoroughly mixed with 98.8 grams (0.4 mol) of 4-nitrobenzenearsonic acid. After solidification the mixture was heated for one hour on the steam bath. During the condensation acetic acid vapors evolved and the weight loss of the reaction mixture was 23.5 grams corresponding to 0.4 mol of acetic acid (theory 24.01 grams). The product was ground to 100% minus 20 mesh and dried at 200° F. to remove the last traces of acetic acid. The yield was 141 grams or 99.8% of the theory. The crude material evolved a gas at 190–192° C. When recrystallized from n-butyl alcohol, it evolved a gas at 165–172° C. The temperature at which gas evolution begins depends in some measure on the rate of heating the sample in melting point tube. The gas evolved is water. The compound decomposed at 260° C. When subjected to analysis, the product was found to contain 15.71% of Sn and 19.87% of As which indicates the formula $(C_4H_9)_2 \cdot Sn \cdot [O—As(O)(OH)—C_6H_4(NO_2)]_2$ requiring a theoretical content of 16.37% Sn and of 20.7% As.

*Example 2.—Di-n-butyl tin di-(3-nitro-4-aminobenzene arsonate)*

70.2 grams (0.2 mol) of di-n-butyl tin diacetate were treated with 104.8 (0.4 mol) of 3-nitro-4-aminobenzene arsonic acid as outlined in the foregoing example. During the reaction approximately 23.7 grams corresponding to 0.4 mol or two equivalents of acetic acid were evolved. The resulting product was of a bright yellow color and was obtained in a yield of 141 grams or 99% of the theory. The product evolved a gas at 189–193° C. and decomposed at 260° C. The analysis gave a value of 16.34% for Sn and 20.2% for As, calling for the formula $(C_4H_9)_2 \cdot Sn \cdot [O—As(O)(OH)—C_6H_3(NH_2)(NO_2)]_2$ which requires a theoretical content of 15.72% Sn and 19.83% As.

*Example 3.—Di-n-butyl tin di-(3-nitro-4-hydroxybenzene arsonate)*

70.2 grams (0.2 mol) of di-n-butyl tin diacetate were mixed with 105.2 grams (0.4 mol) of 3-nitro-4-hydroxybenzenearsonic acid. Following treatment in the manner of the previous examples a dry crop of 148 grams or 100% of the theory was collected. The product evolved gas at 168–171° C., and decomposed at 190° C. Upon recrystallization it evolves a gas at 164–170° C. The analysis of the product yielded 15.05% Sn and 20.4% As, thereby supporting the formula $(C_4H_9)_2 \cdot Sn \cdot [O—As(O)(OH)—C_6H_3(OH)(NO_2)]_2$ which corresponds to a theoretical value of 15.67% Sn and 19.79% As.

*Example 4.—Di-n-butyl tin di-(4-nitrobenzene arsonate)*

20.7 grams (0.0833 mol) of di-n-butyl tin oxide were mixed with 41.2 grams (0.167 mol) of 4-nitrobenzene arsonic acid. 400 cc. of toluene were added as a solvent and the mixture was refluxed for approximately two hours. A stoichiometrical amount of 1.5 ml.=0.0833 mol of water was collected in the Dean and Stark tube, indicating that two arsonic acid radicals had combined with the di-ni-butyl tin portion. When no more water evolved from the mixture, the solution was cooled and the toluene was decanted off. The residue was dried in the air and thereafter ground and screened. The yield was 60.4 grams. The material evolved gas at 192° C. and completely decomposed at 250° C. The assay showed a Sn content of 15.89% and an As content of 19.84% which closely responds to the formula $(C_4H_9)_2 \cdot Sn \cdot [O—As(O)(OH)—C_6H_4(NO_2)]_2$ requiring a theoretical amount of 16.27% Sn and 20.66% As.

*Example 5.—Diphenyl tin di-(butyl arsonate)*

24.0 grams (0.0833 mol) of diphenyl tin oxide were reacted with 30.4 grams (0.167 mol) of butyl arsonic acid as described in Example 4. The reaction was completed after 1.5 ml. of water corresponding to 0.0833 mol was collected in the Dean and Stark tube. After drying a yield of 52.5 grams of the compound was obtained, which decomposed with melting at about 296° C. and showed a Sn content of 19.25% and an As content of 23.12%, thereby answering the configuration $(C_6H_5)_2 \cdot Sn \cdot [O—As(O)(OH)—C_4H_9]_2$ which requires a theoretical amount of 18.69% Sn and 23.59% As.

*Example 6.—Di-n-butyl tin 4-nitrobenzene arsonate*

41.5 grams (0.167 mol) of di-n-butyl tin oxide were dissolved in toluene and heated at approximately 115° C. with 41.2 grams (0.167 mol) of 4-nitrobenzene arsonic acid, until the stoichiometric amount of 3 ml. equal to 0.167 mol of water was removed. After grinding, drying and screening a yield of 79.1 grams was obtained. The product decomposed at 249° C. and upon analysis showed a content of 24.2% Sn and 15.2% As, indicating the formula $(C_4H_9)_2 \cdot Sn \cdot (O_2) \cdot As(O)—C_6H_4(NO_2)$ which calls for theoretical values of 24.84% of Sn and 15.67% of As.

*Example 7.—Di-n-butyl tin 3-nitro-4-hydroxybenzene arsonate*

70.2 grams (0.2 mol) of di-n-butyl tin diacetate were placed in an open dish and added with 52.6 grams (0.2 mol) of 3-nitro-4-hydroxybenzenearsonic acid. The mixture was heated on a steam bath to constant weight until 24.02 grams corresponding to 0.4 mol of acetic acid were lost. The crude material was ground, screened and freed from the last traces of acetic acid. The yield amounted to 98.9 grams or 100% of the theory. The product melted at 191% C. with decomposition and assayed 24.77% Sn and 14.61% As, thereby answering the formula $(C_4H_9)_2 \cdot Sn \cdot (O_2) \cdot As(O)—C_6H_3(OH)(NO_2)$ which requires a theoretical content of 24.03% Sn and of 15.16% As.

*Example 8.—Di-n-butyl tin 4-nitrobenzene arsonate*

70.2 grams (0.2 mol) of di-n-butyl tin diacetate were treated with 49.4 grams (0.2 mol) of 4-nitrobenzene arsonic acid as in the foregoing example. The weight loss of the mixture during the condensation was 24.01 grams corresponding to 0.4 mol of acetic acid. A crop of 95.6 grams or 100% of the theory of the new product was collected which melted at 256° C. with decomposition. The analysis showed 25.21% Sn and 16.2% As corresponding to the formula $(C_4H_9)_2 \cdot Sn \cdot (O_2) \cdot As(O)—C_6H_4(NO_2)$ which requires a theoretical content of 24.83% of Sn and 15.67% of As.

*Example 9.—Di-n-butyl tin 3-nitro-4-aminobenzene arsonate*

70.2 grams (0.2 mol) of di-n-butyl tin diacetate were reacted with 52.4 grams (0.2 mol) of 3-nitro-4-aminobenzene arsonic acid until constant weight was attained. The weight loss was 24.02 grams corresponding to the stoichiometric requirement of 0.4 mol of acetic acid. The yield was 98.6 grams or 100% of the theory and the material decomposed at 262° C. The content of Sn was found to be 24.96% and that of As 14.59%, indicating the formation of $$(C_4H_9)_2 \cdot Sn \cdot (O_2) \cdot As(O) - C_6H_3(NO_2)(NH_2)$$

which theoretically calls for 24.07% Sn and 15.2% As.

*Example 10.—Di-n-butyl tin 4-aminobenzene arsonate*

70.2 grams (0.2 mol) of di-n-butyl tin diacetate were treated with 43.4 grams (0.2 mol) of 4-aminobenzene arsonic acid as in the previous examples, until 24.02 grams=0.4 mol of acetic acid were removed. After elimination of the last traces of acetic acid a yield of 89.6 grams or 100% of the theory was obtained. The product evolved gas at 175–185° C. and decomposed at 271° C. The compound registered a content of 27.1% Sn and of 16.07% As, corresponding to the formula $$(C_4H_9)_2 \cdot Sn \cdot (O_2) \cdot As(O) - C_6H_4(NH_2)$$

which calls for a theoretical value of 26.5% for Sn and of 16.72% for As.

*Example 11.—Diphenyl tin n-butyl arsonate*

2.89 grams (0.01 mol) of diphenyl tin oxide and 1.82 grams (0.01 mol) of n-butyl arsonic acid were mixed with 1.15 ml. of acetic acid. The mixture was heated in an evaporating dish on a hot plate for about 2 hours until a solid mass had formed. A yield of 3.9 grams=86.4% of the theory was obtained. The product melted at 297° C. with decomposition. The material assayed 27.1% Sn and 16.02% As, answering the formula $$(C_6H_5)_2 \cdot Sn \cdot (O_2) \cdot As(O) - C_4H_9$$

which calls for theoretical values of 26.28% Sn and 16.7% As.

*Example 12.—Triphenyl tin 4-nitrobenzene arsonate*

6.10 grams (0.0166 mol) of triphenyl tin oxide were placed in a small conical flask with 4.11 grams (0.0166 mol) of 4-nitrobenzene arsonic acid. The flask was connected with a Dean and Strark apparatus, and the mixture was heated at 150° C. until all the water of reaction was distilled over. An amount of 0.2 ml. of water, corresponding to one equivalent or 0.0166 mol, was collected. The yield of product obtained was 9.7 grams or 98% of the theory. The product melted with decomposition at 272° C. Analysis showed a Sn content of 20.7% and an As content of 12.07%, corresponding to the formula $$(C_6H_5)_3 \cdot Sn \cdot O \cdot As(O)(OH) - C_6H_4(NO_2)$$

which requires in theory a value of 19.92% Sn and of 12.57% As.

Although the invention has been described in the foregoing examples by way of specific illustrations, it will be appreciated that these examples are not limiting in scope but that they are subject to manifold modifications, especially in respect of the starting materials which offer a wide variety of selections. It is further understood that the structural configurations as given for the recited products are merely based upon reasonable expectations in conformity with current concepts prevailing in chemistry and that it is intended to protect the compounds characterized by their atomic ratios as obtained in accordance with the foregoing description and the appended claims, despite the possibility that the structural configurations may be later revised in regard to their formulation in the light of newly acquired knowledge.

What we claim is:

1. Organo tin arsonic acid compounds selected from the group consisting of triorgano tin monoarsonates of the general formula

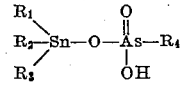

diorgano tin monoarsonates of the general formula

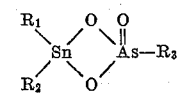

and diorgano tin diarsonates of the general formula

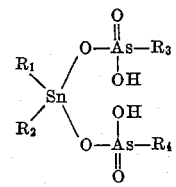

wherein $R_1$, $R_2$, $R_3$ and $R_4$ are members selected from the group consisting of alkyl, alkenyl, alkynyl, a benzene, naphthyl and anthracyl radicals.

2. Triorganotin arsonates of the general configuration

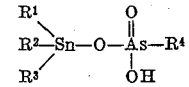

wherein $R^1$, $R^2$, $R^3$ and $R^4$ are selected from the group consisting of alkyl, alkenyl, a benzene, naphthyl and anthracyl radicals.

3. Diorganotin diarsonates of the general formula

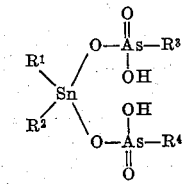

wherein $R^1$, $R^2$, $R^3$, and $R^4$ are selected from the group consisting of alkyl, alkenyl, a benzene, naphthyl and anthracyl radicals.

4. Diorganotin monoarsonates of the general formula

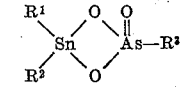

where $R^1$, $R^2$, and $R^3$ are selected from the group consisting of alkyl, alkenyl, a benzene, naphthyl and anthracyl radicals.

5. Dibutyl tin di-(4-nitrobenzene arsonate).
6. Dibutyl tin di-(3-nitro-4-hydroxybenzene arsonate).
7. Diphenyl tin di-(4-aminobenzene arsonate).
8. Dibenzyl tin di-(3-nitro-4-aminobenzene arsonate).
9. Dibutyl tin 4-hydroxybenzene arsonate.
10. A process for preparing organotin arsonates as defined in claim 1 comprising the steps of causing an organotin compound carrying readily reactive electronegative groups to react, at least at steam bath temperature, with an arsonic acid in substantially stoichiometric amounts ranging from one to two equivalents in proportion to said electronegative groups and removing the formed condensate from the mixture.

11. A process for preparing organotin arsonates as defined in claim 1 comprising the steps of causing an organotin compound selected from the group of organotin oxides and low-molecular weight aliphatic carboxylates to react, at least at steam bath temperature, with an arsonic acid in substantially stoichiometric amounts ranging from one to two equivalents in proportion to said tin compound and removing the formed volatile product of reaction.

12. A process for preparing triorganotin arsonates as defined in claim 2 comprising the steps of causing 1 mol of a triorganotin hydroxide to react at about 150° C. with 1 mol of an arsonic acid and removing the formed water of reaction.

13. A process for preparing a diorganotin monoarsonate as defined in claim 4 comprising the steps of causing 1 mol of a diorganotin oxide to react, at least at steam bath temperature, with 1 mol of an arsonic acid and removing the formed water of reaction.

14. A process for preparing diorganotin diarsonates as defined in claim 3 comprising the steps of causing 1 mol of a diorganotin diacetate to react, at least at steam bath temperature, with 2 mols of an arsonic acid and removing the water or reaction.

References Cited in the file of this patent

UNITED STATES PATENTS

| | | |
|---|---|---|
| 2,560,034 | Eberly | July 10, 1951 |
| 2,597,920 | Carroll | May 27, 1952 |
| 2,630,436 | Church | Mar. 3, 1953 |

OTHER REFERENCES

Rochow et al.: J. Am. Chem. Soc., vol. 75, pp. 3099–3101, 260/429 TIN (received Feb. 20, 1953).